No. 871,056. PATENTED NOV. 12, 1907.
B. F. CRARY.
WEIGHING SCALE.
APPLICATION FILED DEC. 4, 1905.

4 SHEETS—SHEET 1.

Witnesses:
R. C. Hamilton.
M. M. Speyer

Inventor,
B. F. Crary.
By Higdon & Higdon
Attys

No. 871,056. PATENTED NOV. 12, 1907.
B. F. CRARY.
WEIGHING SCALE.
APPLICATION FILED DEC. 4, 1905.

4 SHEETS—SHEET 2.

Witnesses:
R. E. Hamilton
M. M. Speyer

Inventor,
B. F. Crary.
By Higdon & Higdon
Attys

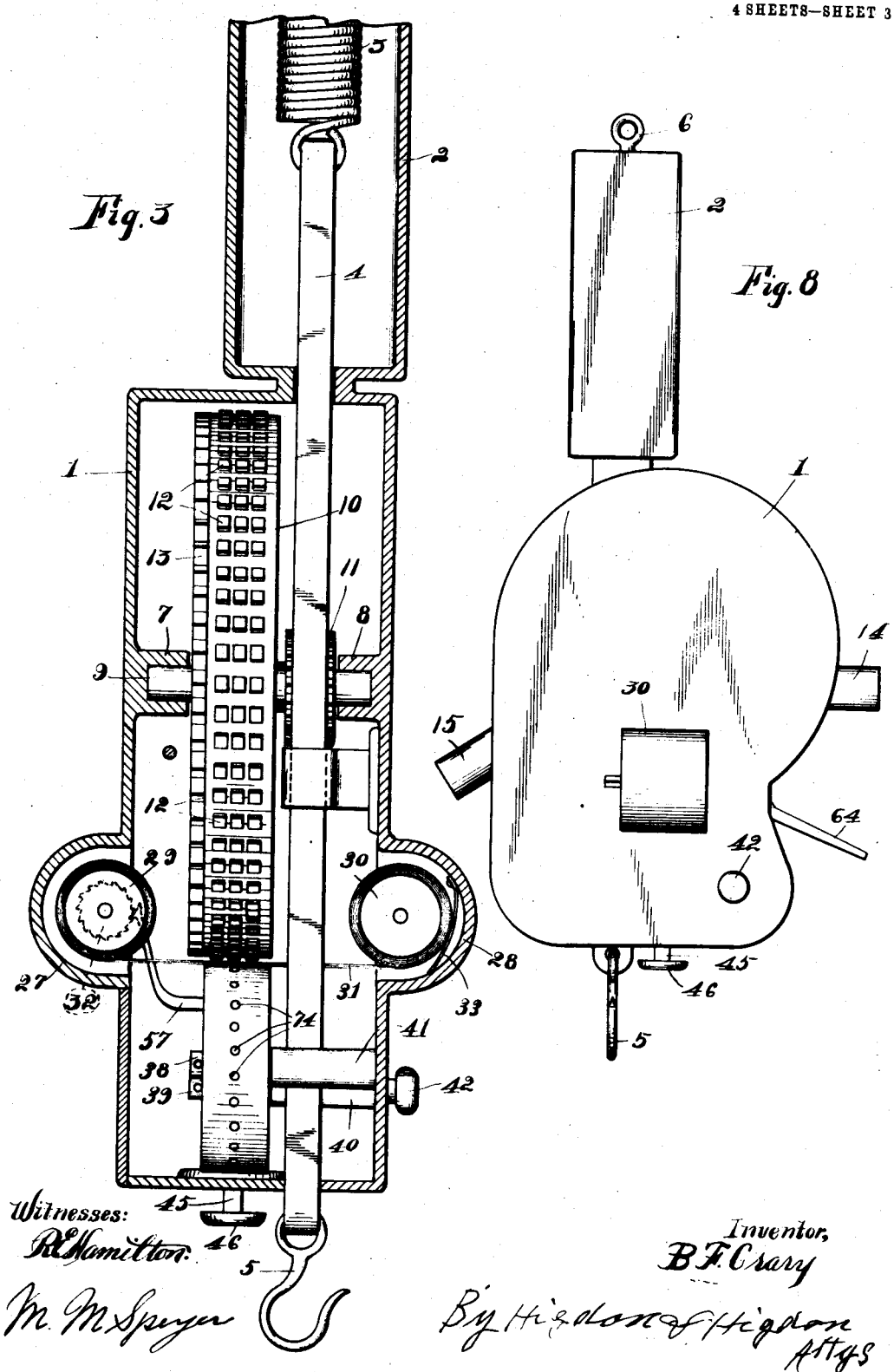

No. 871,056. PATENTED NOV. 12, 1907.
B. F. CRARY.
WEIGHING SCALE.
APPLICATION FILED DEC. 4, 1905.
4 SHEETS—SHEET 4.
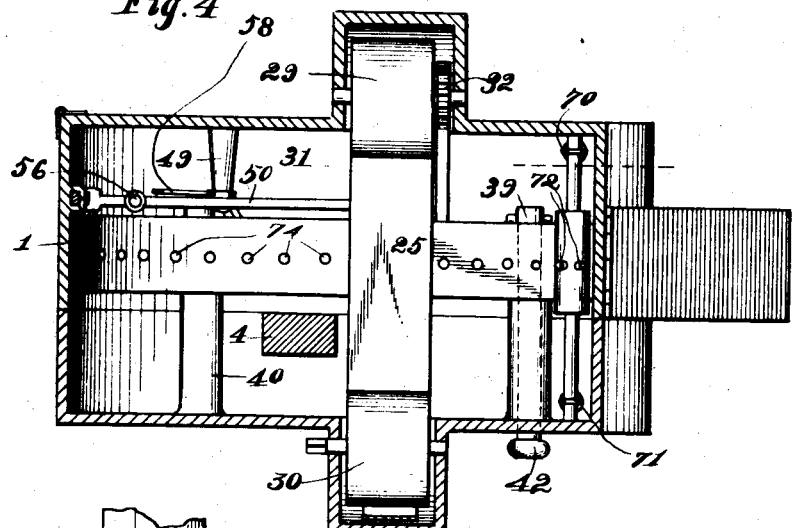
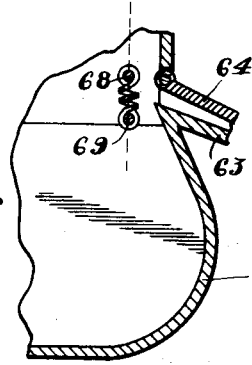
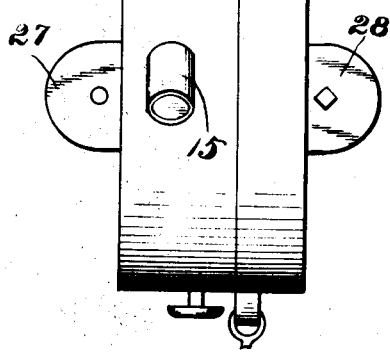
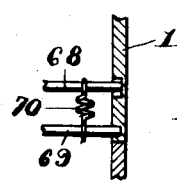
Witnesses:
R. E. Hamilton.
M. M. Speyer.
Inventor,
B. F. Crary
By Higdon & Higdon
Attys

UNITED STATES PATENT OFFICE.

BENJAMIN F. CRARY, OF KANSAS CITY, MISSOURI.

WEIGHING-SCALE.

No. 871,056.  Specification of Letters Patent.  Patented Nov. 12, 1907.

Application filed December 4, 1905. Serial No. 290,191.

*To all whom it may concern:*

Be it known that I, BENJAMIN F. CRARY, a citizen of the United States, residing at Kansas City, in the county of Jackson and State of Missouri, have invented a new and useful Improvement in Weighing-Scales, of which the following is a specification.

My invention relates to improvements in weighing scales, and my first object in producing scales of this character is, mainly, its adaptability in weighing ice in its retail traffic, although it is susceptible as a portable scales for all other weighing purposes. And a second object that I have in view for producing such a scales, is in the distribution of ice to the consumer. The exact weight is numerically indicated in duplicate, on separate slips of paper. And my third object is to produce a scales that cannot be tampered with to affect the weight in the weighing operation.

Figure 1:
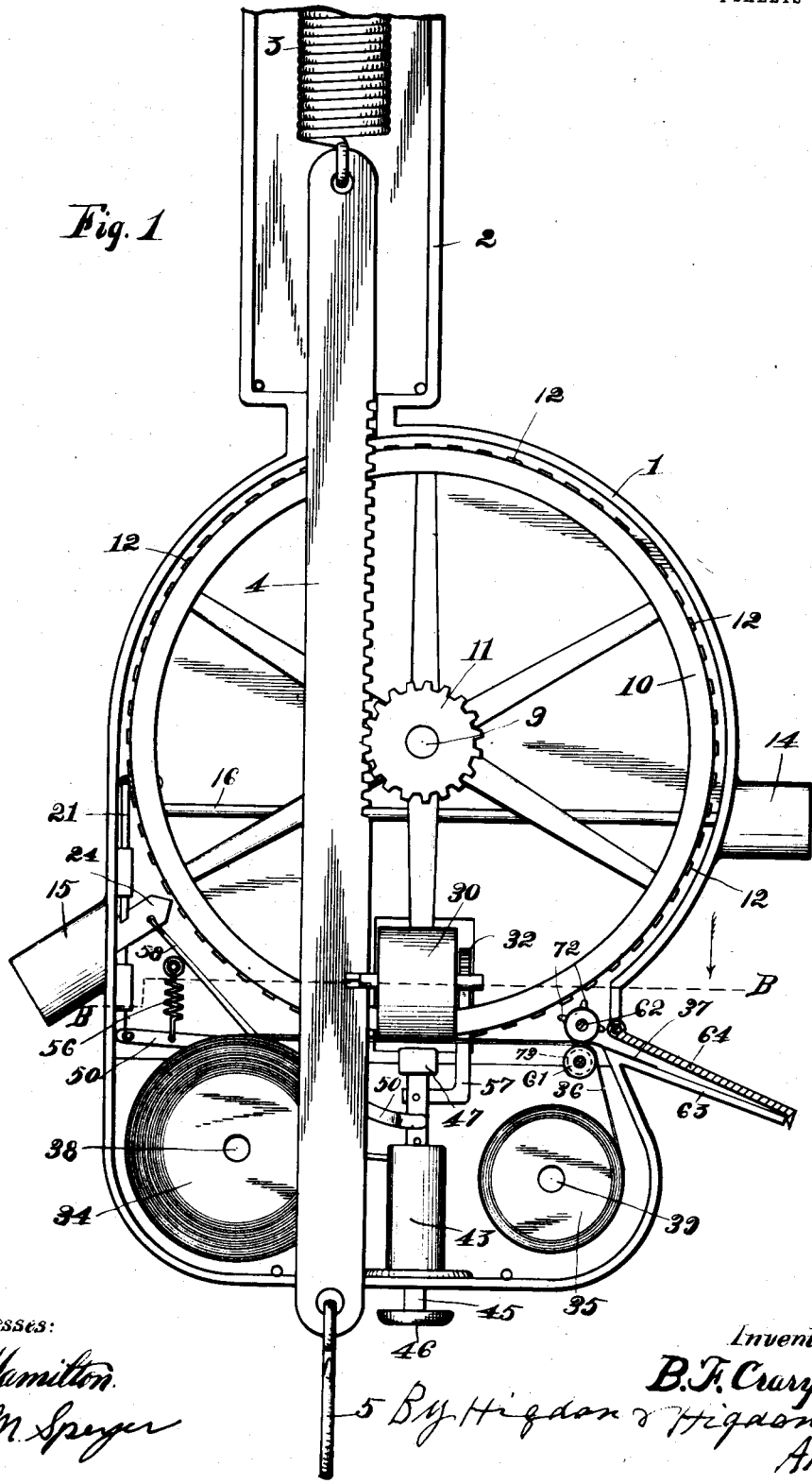
Figure 2:
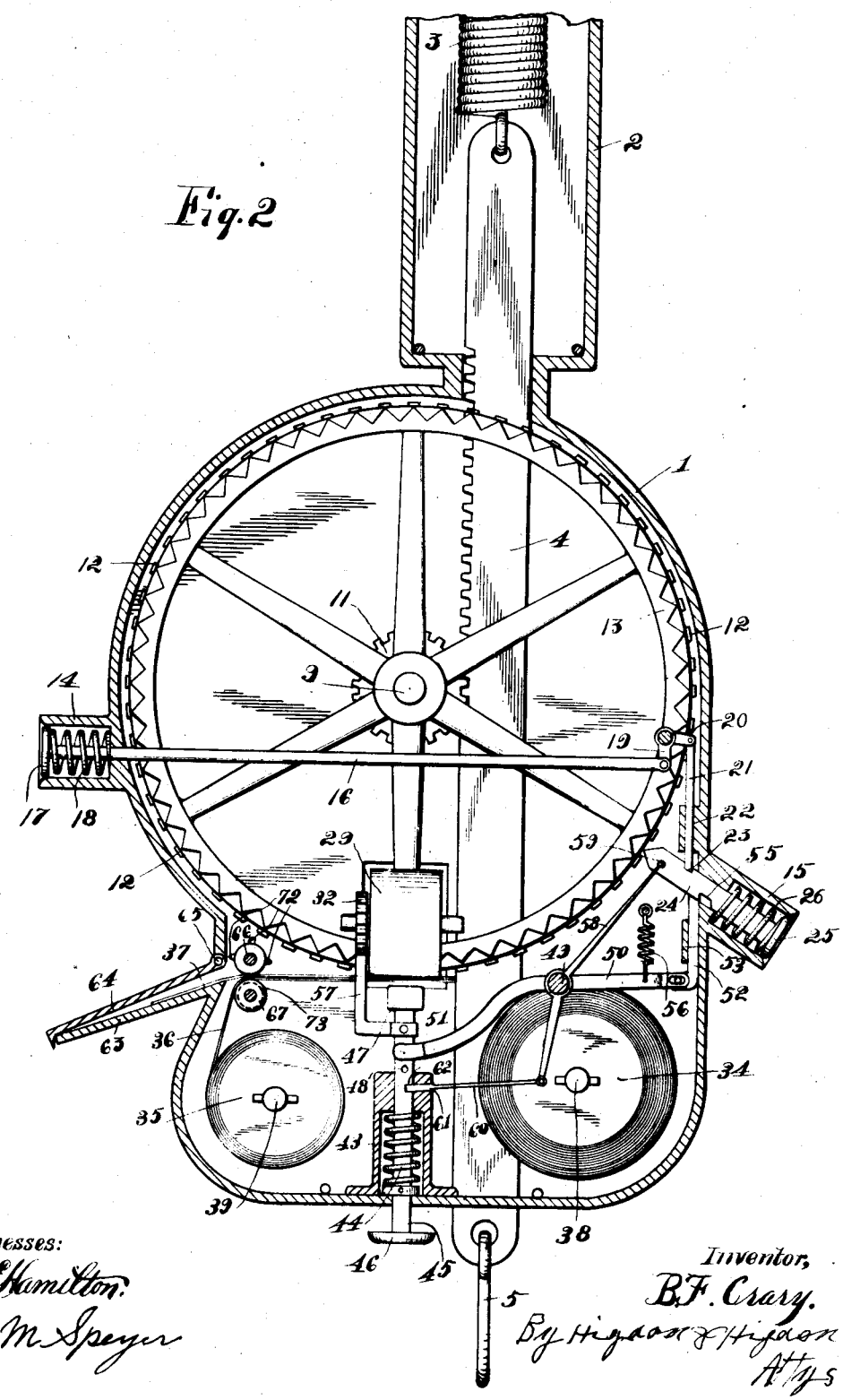

To this end my invention consists in the mechanism and combination hereinafter set forth.
In the drawings accompanying and forming a part of this specification, Figure 1. is a front face elevation of the scales with the front portion of the incasement removed. Fig. 2. is a horizontal view of the scales, with the incasement in section. Fig. 3. is a vertical cross section of the scales, disclosing the position of a type carrying disk, showing the position of two spools or pulleys supporting a printing ribbon. Fig. 4. is a cross section of the scales taken on line B B of Fig. 1. looking in the direction of the pointing dart. Fig. 5.
is a part in section of the scales near the ticket discharge point which will be fully described. Fig. 6. is a section in part of the incasement relating to the same as Fig. 5. which will also be fully described. Figs. 7 and 8. are edge and side or face views of the scales illustrating its configuration, when completed ready for use.

Similar characters designate like parts in all the figures.

My improved scales comprises an incasement 1, extending upward from said incasement and integral therewith is a hollow extension or neck 2. Suspended to the upper inside end of the neck is a spiral or helical spring 3; dependingly secured to said spring is a rack bar 4 vertically extending down through the incasement 1 and passing out at the lower end as shown being provided at this point with a hook 5. The said extension is provided with an eye 6 of sufficient dimensions to suspendingly support the scales and the weight of the ice or other objects to be weighed.
Integral with and oppositely arranged on the inside of the incasement are two inwardly projecting lugs or journals bearings 7 and 8. Supported by these lugs is a shaft 9. Mounted on said shaft is a printing wheel 10 and a pinion 11, the face of said wheel is provided for, or with type 12, containing figures consecutively arranged commencing with one and ending indefi- nitely. Secured to one side of the wheel as seen in Fig. 2. is a notched or serrated band 13. Its purpose will be explained later on. The pinion 11. is adapted to engage the rack bar 4. as seen in Fig. 2 and 3. The weight of the object to be weighed, when suspended on hook 5 affects a rotary movement of the rotating wheel to the extent of weight of said object.

Integral with the incasement 1. are projecting tubes or sleeves 14. and 15., extending from within the tube 14; passing horizontally to near the opposite side of the incasement is a rod 16. The end of the rod in the tube is provided with a push button 17, and incased by a spiral spring 18 as shown. The opposite end of said rod pivotally engages a bell crank 19, pivotally and dependently secured to prong 20 of said bell crank is a rod 21 extending down through a guide 22. integral with the incasement 1., the lower end engaging a notch 23 in a push rod 24. which extends outward through the incasement 1. and tube 15. as shown, the outer end being provided with a push button 25. and a spiral spring 26. the same as rod 16.

Mounted in the extended semi-circles 27 and 28 of the incasement are spools 29 and 30, the spools support a printing ribbon 31, which is held in position under and adjacent to the type printing wheel 10. Spool 29 is provided with a ratchet wheel 32 as shown. One end of the shaft supporting spool 30 is squared to receive a key for winding purposes seen in Figs. 4 and 8. I have also provided a tension spring 33, secured to the inner wall of the projection 28 of the incasement which engages the ribbon to prevent it from unwinding too fast. Located in the lower portion of the incasement 1 are two paper carrying spools 34 and 35, 36 and 37. designating strips of paper wound around the spools. Said spools are supported on shafts 38 and 39, passing through sleeves 40 and 41 which are integral with the incasement 1. Shaft 39, upon which spool 35 is mounted extending out through the incasement, is provided with a knob 42 to be used in winding the slips of paper from spool 34 to spool 35 as fast as it is printed upon and the weight designated. Secured to the lower portion of incasement 1 is an upward extending stand or sleeve 43. Resting in said sleeve is a coil spring 44, extending upward through the incasement, spring, and sleeve is an upwardly disposed printing plunger 45, which is provided with a push button 46 on the lower end and a printing head 47 on the upper end, and is further provided with a check pin 48 to prevent it from dropping too low down.

Supported on a protruding lug 49. which is integral with the inner wall of the incasement 1. is a horizontally disposed lever 50. The inner end is pivotally connected to plunger 45 at 51, the end pivotally connecting a vertical rod 52, said rod extending upward, passing through a supporting guide 53, its upper end being adapted to engage and disengage a notch 55 in push rod 24. 56 is a helical spring adapted to aid in the movement of lever 50.

Secured to plunger rod 45 is an outward and upwardly extending arm 57. Its upper and outer end is provided with a hook which is adapted to slidingly engage ratchet wheel 32 on the upward and downward movement of plunger rod 45.

Pivotally secured to projecting lug 49 is an inclined rod 58, the upper end pivotally engaging push rod 24 at 59, the lower end pivotally engaging one end of a horizontal rod 60, the opposite end of said rod 60 passing through opening 61 in the upper end of sleeve 43 and engaging an opening 62 in plunger rod 45.

Integral with the incasement 1. is an extended paper guide 63, which is provided with a lid 64 pivotally secured to the incasement at 65. 66 and 67 designate guide rollers, between these the paper passes after the printing is performed. These rollers are mounted on rods 68 and 69 and are held in proper tension by compression springs 70 and 71.

The operation of my invention is as follows: After the scales are suspended by eye 6, the object to be weighed is hung on hook 5, which will cause spring 3 to distend by the downward pull on rack bar 4. This will cause a rotary movement of the printing wheel 10. Said wheel coming to a standstill when the downward pull on spring 3 is equal to the weight of the object being weighed, stopping with a line or tier of indicated numerals 12, over ribbon 31 at a point designated 125, seen on said ribbon at Fig. 4. which is immediately over the printing head 47 of the printing plunger 45. The weigh-master now places one finger of one hand on push button 17, and one finger of the other hand on push button 25, and with a slight pressure on each of said buttons. At the same time vertical rod 21 is raised from notch 23 in push rod 24, and the pressure on push button 25 will force the inner point of push rod 24 to snugly engage one of the notches in the serrated band 13 and admit the upper end of vertical rod 52 to engage notch 55 in push rod 24, at the same moment the lower end of lever 58 will cause rod 60 to be withdrawn from opening 62 in plunger rod 45; then with an upward pressure on push button 46, the exact weight of the object weighed will be indicated by numerals in duplicate on the slips of paper designated 36 and 37. After the printing is done, spool 35 is turned to the right by knob 42. This will force strip of paper 37 out through paper guide 63 and winding strip 36 on said spool 35 to the extent, until the weight indicated on slip 37 reaches the end of paper guide 65 where it is clipped off and handed to customer with the article weighed, at the same time, the strip of paper 36 containing the duplicate number is wound on spool 35. The same movement must be repeated for each weighing.

It will be further observed that guide roller 66 is provided with a plurality of outward extending lugs 72, and guide roller 67 is provided with a circumferential groove 73 indicated by dotted lines, equal in depth to the extended length of the said lugs, so that the two rollers can work harmoniously together unobstructed. The two strips of paper, 36 and 37, or more if needed, are longitudinally and correspondingly perforated, as indicated at 74 on the paper carried by spool 34. It is my purpose to have each strip of paper correspondingly numbered at intervals, a sufficient distance apart, so that a number will appear with the weight indicated on each slip of paper torn off, and corresponding numbers pass to spool 35 already described. The object of said lugs 72 are to engage the perforations 74 in the paper, so that the paper will correspondingly pass out between said rollers 66 and 67, overcoming the slight variation incident to winding a number of slips of paper, one over the other on the same spool.

Having now fully described my invention, what I claim and desire to secure by Letters Patent is:

1. In a weighing-scales of the kind specified, the combination of an incasement, an upward extending neck 2, an outward extending sleeve 14 integral with the incasement, a horizontal rod longitudinal of the incasement carrying push button and coil spring in sleeve 14 a bell-crank engaged by its opposite end, a sleeve 15, a push rod carrying push button and coil spring supported in said sleeve, and a vertical rod dependently carried by said bell-crank, the lower end adapted to engage and disengage said push rod.

2. In a weighing scales of the kind specified the combination of an incasement, outwardly projecting sleeves, and a paper discharging guide integral with the incasement, a vertical sleeve mounted in the lower inside of the incasement, a printing plunger and a coil spring engaging said sleeve, a ratchet wheel, an outward and upward extending arm carried by the plunger and adapted to engage and disengage said ratchet wheel, a vertically disposed rod, a lever 50 the lower end thereof engaging the printing plunger, and the upper end supporting vertical rod and a push rod adapted to be engaged by the upper end of said vertically disposed rod.

3. In weighing scales of the character described, the combination of the incasement, a vertical sleeve 43 in the lower portion thereof, a helical spring therein, a printing plunger passing through the spring and the sleeve, a push-rod a lever 58 the upper end engaging said push rod, a horizontal rod 60, one end engaging lever 58, the opposite end adapted to engage and disengage the printing plunger, substantially as described.

4. In a weighing scales of the kind specified, the combination of an incasement, a rack bar, a horizontal shaft, a printing wheel and a pinion mounted on the shaft, the pinion engaging the rack bar, paper carrying rollers and paper guide rollers; one of said guide rollers provided with a plurality of extending lugs, its companion provided with a circumferential groove, perforated slips of paper carried by the paper roller 34, and discharged by the said guide rollers, substantially as described.

In testimony whereof I affix my signature in the presence of two witnesses.

BENJAMIN F. CRARY.

Witnesses:
MARY N. HIGDON,
M. M. SPEYER.